US006829020B2

(12) United States Patent
Kotani et al.

(10) Patent No.: US 6,829,020 B2
(45) Date of Patent: Dec. 7, 2004

(54) RECORDING METHOD AND RECORDING APPARATUS FOR THERMOREVERSIBLE RECORDING MEDIUM

(75) Inventors: Shoji Kotani, Otsu (JP); Hideaki Ueda, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 295 days.

(21) Appl. No.: 09/818,969

(22) Filed: Mar. 27, 2001

(65) Prior Publication Data

US 2001/0038424 A1 Nov. 8, 2001

(30) Foreign Application Priority Data

Mar. 29, 2000 (JP) ........................................ 2000-091611

(51) Int. Cl.[7] .......................... G02F 1/133; G02F 1/03; G11B 7/24
(52) U.S. Cl. .............................. 349/2; 349/20; 349/21; 349/22; 430/19; 430/20; 369/275.2
(58) Field of Search ................................ 349/2, 20–22; 369/275.2; 359/3; 430/19, 20

(56) References Cited

U.S. PATENT DOCUMENTS

| | | | | |
|---|---|---|---|---|
| 5,869,420 A | * | 2/1999 | Naito | 503/201 |
| 5,922,528 A | * | 7/1999 | Weaver et al. | 430/617 |
| 6,103,431 A | * | 8/2000 | Tamaoki et al. | 430/20 |
| 6,197,460 B1 | | 3/2001 | Tamaoki et al. | 430/20 |

FOREIGN PATENT DOCUMENTS

JP  11-024027 A  1/1999

OTHER PUBLICATIONS

"Rewritable Full–Color Recording on a Thin Solid Film of a Cholesteric Low–Molecular–Weight Compound", by Nobuyuki Tamaoki, Alexander V. Parfenov, Atsushi Masaki, and Hiro Matsuda, *Advanced Materials*, 1997, 9, No. 14, pp. 1102–1104.

* cited by examiner

*Primary Examiner*—Robert H. Kim
*Assistant Examiner*—Andrew Schechter
(74) *Attorney, Agent, or Firm*—Sidley Austin Brown & Wood LLP (57) ABSTRACT

Disclosed herein is a recording method for recording an image on a thermosensible image bearing medium that contains liquid crystal material. The liquid crystal exhibits a cholesteric phase at a temperature range higher than a room temperature so as to reflect selected wavelength of light based on heated temperature within the temperature range. Since the cholesteric liquid crystal material has a different response time for each selective reflection wavelength, an optimum energy application time is required for obtaining a desired recording color. Accordingly, in the recording method, it is getting higher the heating temperature, shorter the application time. The application time can be adjusted by the pulse width and/or pulse number of the applied energy.

4 Claims, 4 Drawing Sheets (A)

Short Wavelength (High Temp.)   Long Wavelength (Low Temp.)

(B)

Short Wavelength (High Temp.)   Long Wavelength (Low Temp.)

Short Wavelength (High Temp.) → Long Wavelength (Low Temp.)

(B)

Short Wavelength (High Temp.) → Long Wavelength (Low Temp.)

FIG. 7

RECORDING METHOD AND RECORDING APPARATUS FOR THERMOREVERSIBLE RECORDING MEDIUM

REFERENCE TO RELATED-APPLICATION

This application is based on Japanese Patent Application No. 2000-091611 filed in Japan on Mar. 29, 2000, the entire content of which is hereby incorporated by reference.

BACKGROUND OF THE INVENTION

1. Field of the Invention

The present invention relates to a method for recording an image onto a thermoreversible recording medium capable of multicolor display, and a recording apparatus therefor.

2. Description of the Related Art

In recent years, reversible thermosensitive recording media capable of repeating recording and erasing of an image have received attention from the viewpoints of visualization of electronic information and resource savings, and some of them have become commercially available. As typical examples thereof, high polymer/low polymer mixed types and leuco dye/long-chain alkyl developer mixed types are known.

Since recording of a larger amount of information is required hereafter, there has been demanded a reversible thermosensitive recording medium capable of full-color and high-precision recording. However, the display colors are limited to colors of opacity and transparency for the high polymer/low polymer mixed type. Whereas, there also occurs color development of only a single color or two colors for the leuco dye/long-chain alkyl developer mixed type.

As the materials effective for a recording medium capable of multicolor recording and erasing, there have been known cholesteric liquid crystal materials with a molecular weight of about 1000 in JP-A-11-24027. The cholesteric liquid crystal materials are characterized by showing selective reflection for only a light of a specific wavelength within the liquid crystal phase temperature region, and having a selective reflection wavelength that changes with temperature. Further, for the cholesteric liquid crystal material, the selective reflection state for a specific wavelength can be fixed by quenching from the liquid crystal phase temperature region to the solid phase temperature region, which becomes a feature effective as the material for the thermoreversible recording medium.

However, the study by the present inventors has proved that the cholesteric liquid crystal material changes in color, while varying in the length of time required for recording and erasing (response time) depending upon temperature. Therefore, the following problem may occur. That is, in the case of recording through the application of heat for a fixed time, changing into a prescribed color is not completed because of an insufficient quantity of heat for recording at a temperature requiring a long response time. Further, for recording at a temperature requiring a short response time, the material is applied with heat more than required, resulting in wastes of time and energy.

SUMMARY OF THE INVENTION

Under such circumstances, it is therefore an object of the present invention to provide a recording method and a recording apparatus on a thermoreversible recording medium which promotes effective utilization of applied energy, and enables high-quality recording over the entire display color region.

The present inventors have conducted a close study for attaining the foregoing object, and have obtained the following findings. (1) The cholesteric liquid crystal material has a different response time for each selective reflection wavelength, so that an optimum energy application time is required for obtaining a desired recording color. Especially, since the emission color precision increases with a decrease in heating temperature, a certain degree of application time becomes necessary. (2) The application time in the foregoing item (1) can be adjusted by the pulse width and/or pulse number of the applied energy.

With the recording method achieved based on the foregoing findings in accordance with the present invention, the energy application time is extended with a decrease in heating temperature for a thermoreversible recording medium capable of multicolor display, provided with a thermosensitive recording layer containing a cholesteric liquid crystal material.

The recording apparatus in accordance with the present invention includes an energy application means for extending the energy application time with a decrease in heating temperature for a thermoreversible recording medium capable of multicolor display, provided with a thermosensitive recording layer containing a cholesteric liquid crystal material.

The cholesteric liquid crystal material is comprised of not less than one of liquid crystalline compound that exhibits a cholesteric phase at a temperature range higher than room temperature, and reflects light in a visible wavelength region corresponding to the temperature, and is fixed still in the reflection state by quenching from the temperature. Examples of such a material include the materials as described in Adv. Mater. 1997, 9, No. 14, pp.1102–1104, and liquid crystal materials having other chemical structures, and having the same properties are also acceptable. To the liquid crystal materials, other liquid crystalline compounds and non-liquid crystalline compounds may also be added.

By varying the energy application time on the thermosensitive recording layer containing the cholesteric liquid crystal material described above, it became possible to perform high-quality recording with high contrast over the entire display color region, and thus to utilize the applied energy effectively. The energy application time can be adjusted by the time width and/or number of a pulse.

The energy application can be accomplished by a heat generating unit such as a thermal head, or by means of laser irradiation. When heating is conducted through the laser irradiation, a photothermal converter is preferably provided in the recording medium.

BRIEF DESCRIPTION OF DRAWINGS

These and other objects, advantages and features of the invention will become apparent from the following description thereof taken in conjunction with the accompanying drawings in which.

DETAILED DESCRIPTION OF THE PREFERRED EMBODIMENTS

Below, embodiments of a recording method and a recording apparatus for a thermoreversible recording medium in accordance with the present invention will be described by reference to the accompanying drawings. Incidentally, in the following respective embodiments, the description is given by making mention of specific substance names, which is actually one example, and the present invention does not cover only these substances, so that various materials can be used.

Figure 1:
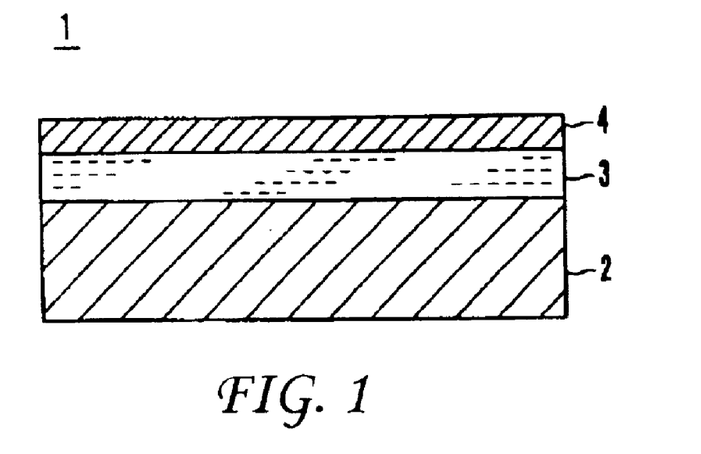
FIG. 1 is a cross sectional view showing a first example of a thermoreversible recording medium to which a recording method of the present invention is applied.
Figure 2:
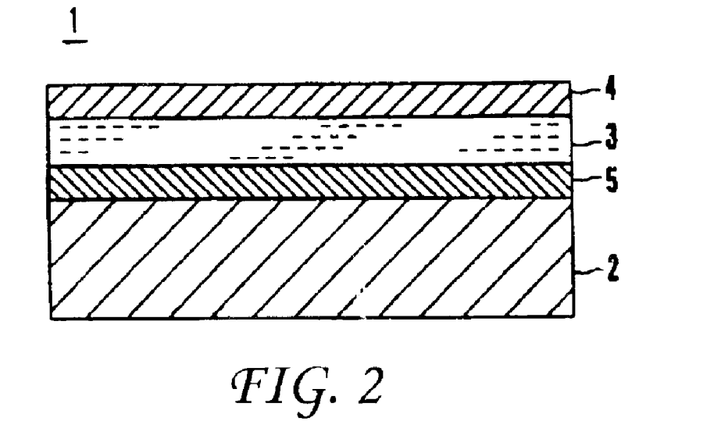
FIG. 2 is a cross sectional view showing a second example of the thermoreversible recording medium to which the recording method of the present invention is applied.
Figure 3:
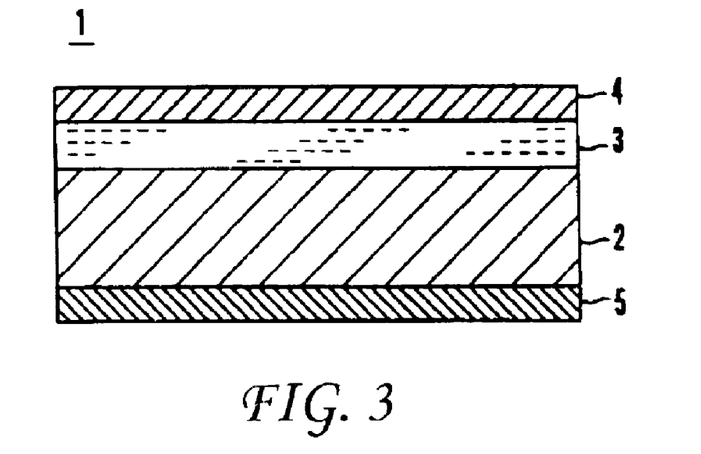
FIG. 3 is a cross sectional view showing a third example of the thermoreversible recording medium to which the recording method of the present invention is applied.

Thermoreversible Recording Medium, see FIGS. 1–3

FIG. 1 shows a first example of a thermoreversible recording medium serving as a recording object in a recording method in accordance with the present invention. The recording medium 1 is comprised of a support 2, a thermosensitive recording layer 3, and a protective layer 4. As the material for the support 2 and the protective layer 4, glass or a polymer material is used. Especially, if a polymer film having a flexibility is used for the support 2, paper-like handling such as bending or binding in a plurality thereof becomes possible. Examples of the polymer material usable include polyethylene terephthalate, polycarbonate, polyether sulfone, and polyphenyl sulfide.

A light absorption layer may also be provided for allowing the absorption of light rays of other wavelengths than the selective reflection wavelength. For example, if a polymer film containing carbon black and the like is used as the support 2 in the thermoreversible recording medium 1 shown in FIG. 1, the support 2 can also serve as the light absorption layer.

Further, FIG. 2 shows a second example of the thermoreversible recording medium 1. A light absorption layer 5 may also be provided between the support 2 and the thermosensitive recording layer 3 as with the thermoreversible recording medium 1 of the second example. As the materials for the light absorption layer 5, resins or coating materials for coating, containing carbon black, dye, or the like can be used.

Still further, FIG. 3 shows a third example of the thermoreversible recording medium 1. The light absorption layer 5 may also be provided on the side of the support 2 opposite to the thermosensitive recording layer 3 as with the thermoreversible recording medium 1 of the third example. It is noted that this light absorption layer 5 also serves as a photothermal converter for writing by means of laser described below.

Figure 4:
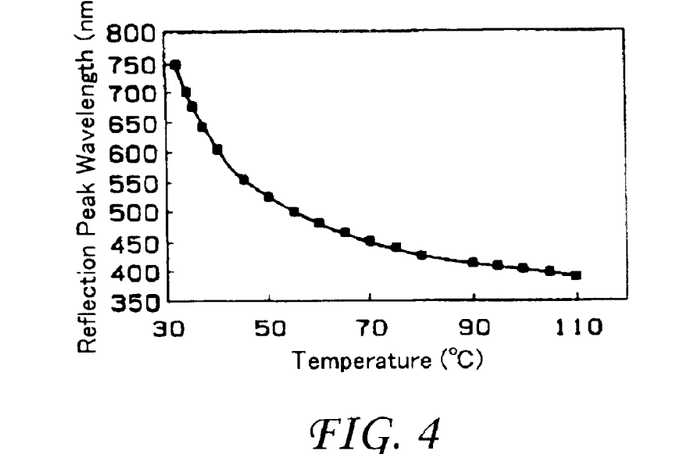
FIG. 4 is a graph showing the temperature characteristics of a cholesteric liquid crystal material.

The thermosensitive recording layer 3 contains a cholesteric liquid crystal material that exhibits a cholesteric phase at a temperature range higher than room temperature, and reflects light in a visible wavelength region corresponding to the temperature, and is fixed still in the reflection state by quenching from the temperature. The cholesteric liquid crystalline material is comprised of not less than one liquid crystalline compound. Further, a non-liquid crystalline compound may also added thereto. Examples of the cholesteric liquid crystal material usable include the compounds as shown in the following chemical formulae (A) and (B):

Temperature Characteristics, see FIG. 4

As the example of the temperature characteristics of the cholesteric liquid crystal material, the relationship between the temperature and the selective reflection peak wavelength in the mixture of the compounds (A) and (B) is shown in FIG. 4. Herein, the selective reflection derived from the cholesteric liquid crystal phase is observed between 32° C. and 110° C.

Within the temperature range showing selective reflection, selective reflection occurs at a shorter wavelength on a higher temperature side, and at a longer wavelength on a lower temperature side. Further, the study by the present inventors has proved that the viscosity is lower and the response time is shorter on a higher temperature side (selective reflection occurs on the short wavelength side), while the viscosity is higher and the response time is longer on a lower temperature side (selective reflection occurs on the long wavelength side). For example, in the case of the mixture of the compounds (A) and (B), the response time at not less than 50° C. for showing from blue to green color is within 0.5 second, while the response time at 40° C. for showing orange color is not less than one second.

The study by the present inventors has also proved that such a difference in response time according to temperature is not limited to the mixture of the compounds (A) and (B), but it is the tendency which can be observed in most cholesteric liquid crystal materials. Therefore, in writing on the thermoreversible recording medium using a cholesteric liquid crystal material, by optimally setting the energy application time in accordance with temperature, especially by extending the energy application time with a decrease in the heating temperature, it becomes possible to perform high-quality recording in such a manner that the energy utilization is effective, and no portion unchanged in color occurs.

Figure 5:
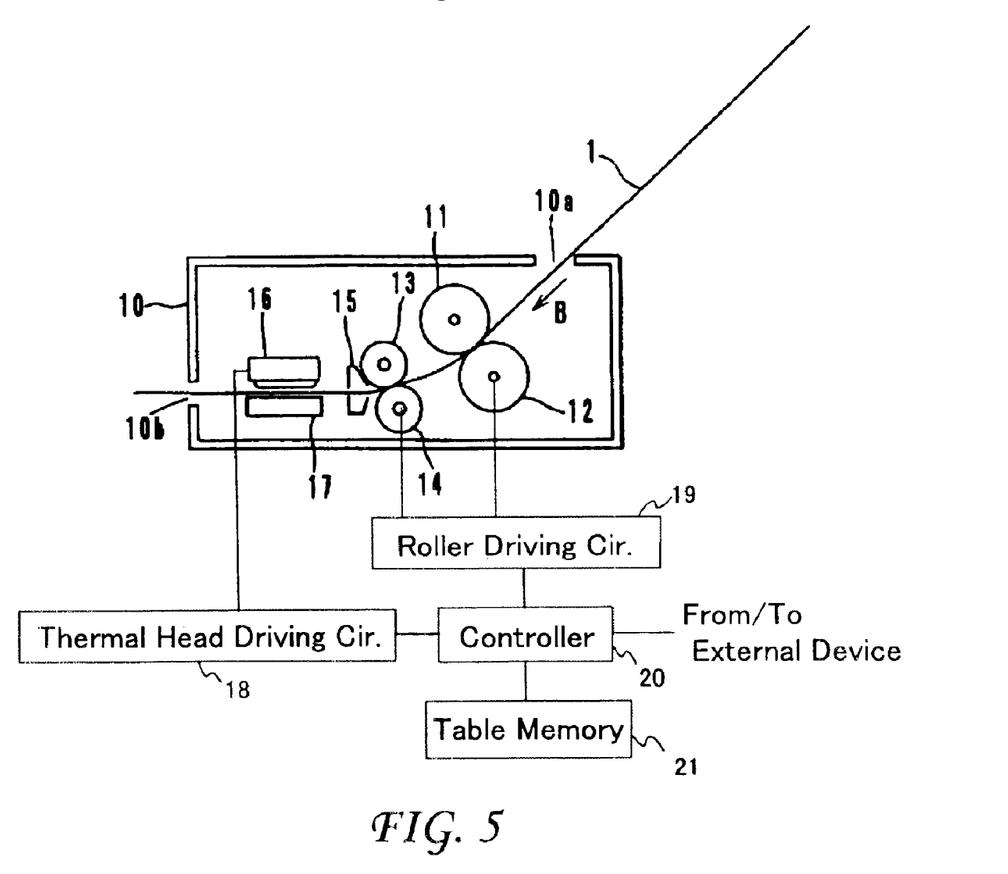
FIG. 5 is a schematic block diagram of a thermal printer.
Figure 6:
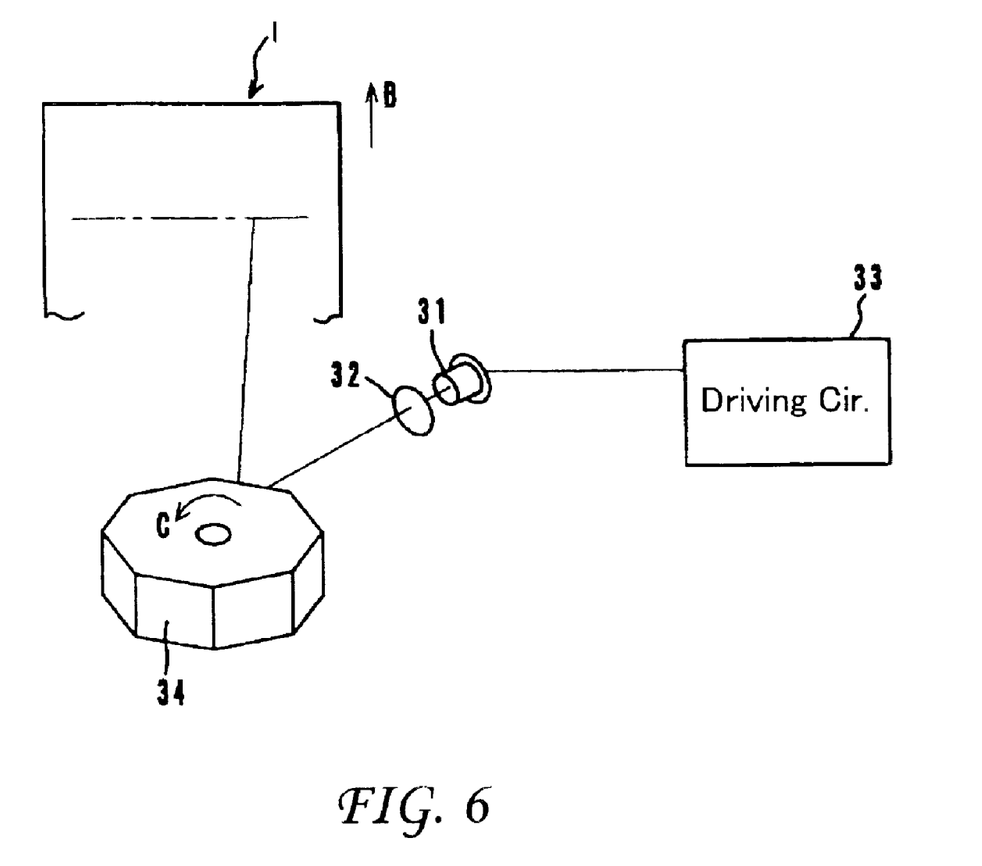
FIG. 6 is a schematic block diagram of a laser printer.

Recording Apparatus, see FIGS. 5 and 6

As a recording apparatus for applying energy, a heating apparatus having a heat generating unit which can be made in contact with the thermoreversible recording medium. As the forms of such an apparatus, for example, a thermal head, a thermal stamp, and the like, as used in a thermal transfer printer can be used. Alternatively, a laser scanning apparatus can also be used.

As an example of the recording apparatus by means of a heat generating unit, a thermal printer is shown in FIG. 5. This printer is provided with transfer rollers 11 and 12, heat rollers 13 and 14, a cooler 15, a thermal head 16 comprising an array of heater elements, and a platen 17 along the advance direction B of the thermoreversible recording medium 1 in a housing 10. Further, the thermal printer has a thermal head driving circuit 18 for independently driving each the heater element of the thermal head 16, a roller driving circuit 19 for driving the transfer rollers 11 and 12, and the heat rollers 13 and 14, a controller 20 for controlling these driving circuits 18 and 19, and a table memory 21 connected to the controller 20. The table memory 21 stores different information (voltage value, pulse width, and the like) of the waveform of the voltage pulse to be applied on the thermal head 16 for every color to be reproduced.

TABLE 1

| Color | Voltage value | Pulse width |
|---|---|---|
| $C_1$ | $V_1$ | $W_1$ |
| $C_2$ | $V_2$ | $W_2$ |
| $C_3$ | $V_3$ | $W_3$ |
| . | . | . |
| . | . | . |
| . | . | . |
| $C_n$ | $V_n$ | $W_n$ |

In Table 1 described above, $C_1, C_2, C_3, \ldots,$ and $C_n$ each denote their respective colors to be reproduced, and each reference character with a smaller numerical subscript number (each of 1 to n) denotes a color on a longer wavelength side (red side), while each with a larger subscript number denotes a color on a shorter wavelength side (blue side). $V_1, V_2, V_3, \ldots,$ and $V_n$ each denote their respective voltage values of the applied voltage pulses for their corresponding colors to be reproduced, and they have the relationship of $V_1<V_2<V_3<\ldots<V_n$. $W_1, W_2, W_3, \ldots,$ and $W_n$ each denote their respective pulse widths of the applied voltage pulses for their corresponding colors to be reproduced, and they have the relationship of $W_1>W_2>W_3>\ldots>W_n$. Namely, in the example shown in Table 1, the pulse width is reduced with an increase in voltage value of the applied voltage pulse.

Table 2 below shows another example of the waveform information of a voltage pulse to be stored in the table memory 21.

TABLE 2

| Color | Voltage value | Pulse width | Pulse number | Application cycle |
|---|---|---|---|---|
| $C_1$ | $V_1$ | $W_1$ | $N_1$ | $F_1$ |
| $C_2$ | $V_2$ | $W_2$ | $N_2$ | $F_2$ |
| $C_3$ | $V_3$ | $W_3$ | $N_3$ | $F_3$ |
| . | . | . | . | . |
| . | . | . | . | . |
| . | . | . | . | . |
| $C_n$ | $V_n$ | $W_n$ | $N_n$ | $F_n$ |

In Table 2 described above, $C_1, C_2, C_3, \ldots,$ and $C_n$ each denote their respective colors to be reproduced, and each reference character with a smaller numerical subscript number (each of 1 to n) denotes a color on a longer wavelength side (red side), while each with a larger subscript number denotes a color on a shorter wavelength side (blue side). $V_1, V_2, V_3, \ldots,$ and $V_n$ each denote their respective voltage values of the applied voltage pulses for their corresponding colors to be reproduced, and they have the relationship of $V_1<V_2<V_3<\ldots<V_n$. $W_1, W_2, W_3, \ldots,$ and $W_n$ each denote their respective pulse widths of the applied voltage pulses for their corresponding colors to be reproduced, and they have the relationship of $W_1=W_2=W_3=\ldots=W_n$. $N_1, N_2, N_3, \ldots,$ and $N_n$ each denote their respective pulse numbers of the applied voltage pulses for their corresponding colors to be reproduced, and they have the relationship of $N_1>N_2>N3>\ldots>N_n$. $F_1, F_2, F_3, \ldots,$ and $F_n$ each denote their respective application cycles of the applied voltage pulses for their corresponding colors to be reproduced, and they have the relationship of $F_1=F_2=F_3=\ldots=F_n$. Namely, in the example shown in Table 2, the pulse number is increased with an increase in voltage value of the applied voltage pulse. Incidentally, in this example, the pulse width and the application period are made constant among respective reproduction colors, but these may be varied among respective reproduction colors.

The recording operation in the foregoing thermal printer will be described below. The controller 20 gives a command to the roller driving circuit 19 when it receives a print command from outside the printer, so that the transfer rollers 11 and 12 are rotated to introduce the recording medium 1 into the printer. Whereas, the controller 20 gives a command to the roller driving circuit 19, so that the heat rollers 13 and 14 are rotated. Consequently, the recording medium 1 introduced by the transfer rollers 11 and 12 are transferred to the heat rollers 13 and 14 to be heated, and further quenched by the cooler 15. In this process, the contents recorded on the recording medium 1 are erased. Then, the recording medium 1 is further transferred between the platen 17 and the thermal head 16 by means of the rotation of the transfer rollers 11 and 12, and the heat rollers 13 and 14. Here, required information is written on the recording medium 1. Namely, the controller 20 analyzes the color information indexed by the image data inputted from outside the printer, reads out the information on the appropriate voltage pulse from the table memory 21 based on the color information, and outputs a control signal to the thermal head driving circuit 18 based on the read information. The thermal head driving circuit 18 outputs a voltage pulse signal to the thermal head 16 based on the received control signal. Then, the recording medium 1 which has been rendered in the display state by heating with the thermal head 16 is spontaneously quenched after stopping the heating from the thermal head 16 to achieve fixing of writing, and discharged from an outlet port 10b.

Incidentally, the recording medium 1 is quenched by self-cooling after passing through the heat generating unit provided at the thermal head 16, and hence the cooling means for the recording medium 1 is essentially unnecessary. However, for allowing recording with more reliability, a cooler 15 may be provided as shown in FIG. 5, or another cooler may also be provided downstream the thermal head 16.

Further, as the energy application method, laser irradiation is also possible. The laser light source usable may be a carbon dioxide gas laser, a YAG laser, an excimer laser, a semiconductor laser, or the like. When a laser having an oscillation wavelength not absorbable by the cholesteric liquid crystal material is used, a photothermal converter is provided as a heat generating source in the recording medium 1. On the other hand, when a laser having an oscillation wavelength absorbable by the cholesteric liquid crystal material is used, the cholesteric liquid crystal material itself generates heat, and hence the photothermal converter may not be provided.

As an example of the recording apparatus by means of a laser, FIG. 6 shows the configuration of the head of a laser printer. With this laser printer, a laser light source 31 is modulated by a driving circuit 33, and a radiated laser beam is made incident through a collimator lens 32 on a polygon mirror 34. The polygon mirror 34 is rotatably driven in the direction indicated with an arrow C, and the laser beam is deflected based on this rotation to linearly scan over the recording medium 1, and the recording medium 1 is transferred in the direction indicated with an arrow B, so that two-dimensional information is written thereon. Incidentally, optical elements (not shown) such as an f θ lens are also provided in the laser printer. The color to be written is controlled by the radiant energy and/or the energy application pulse width of the laser light source 31. Alternatively, a different laser light source may also be provided for every color to be written.

Further, in this laser printer, as with the foregoing thermal printer, a table memory storing different voltage pulse information for every color to be reproduced may be prepared, so that the driving circuit 33 is controlled by reference to this table memory.

Figure 7:
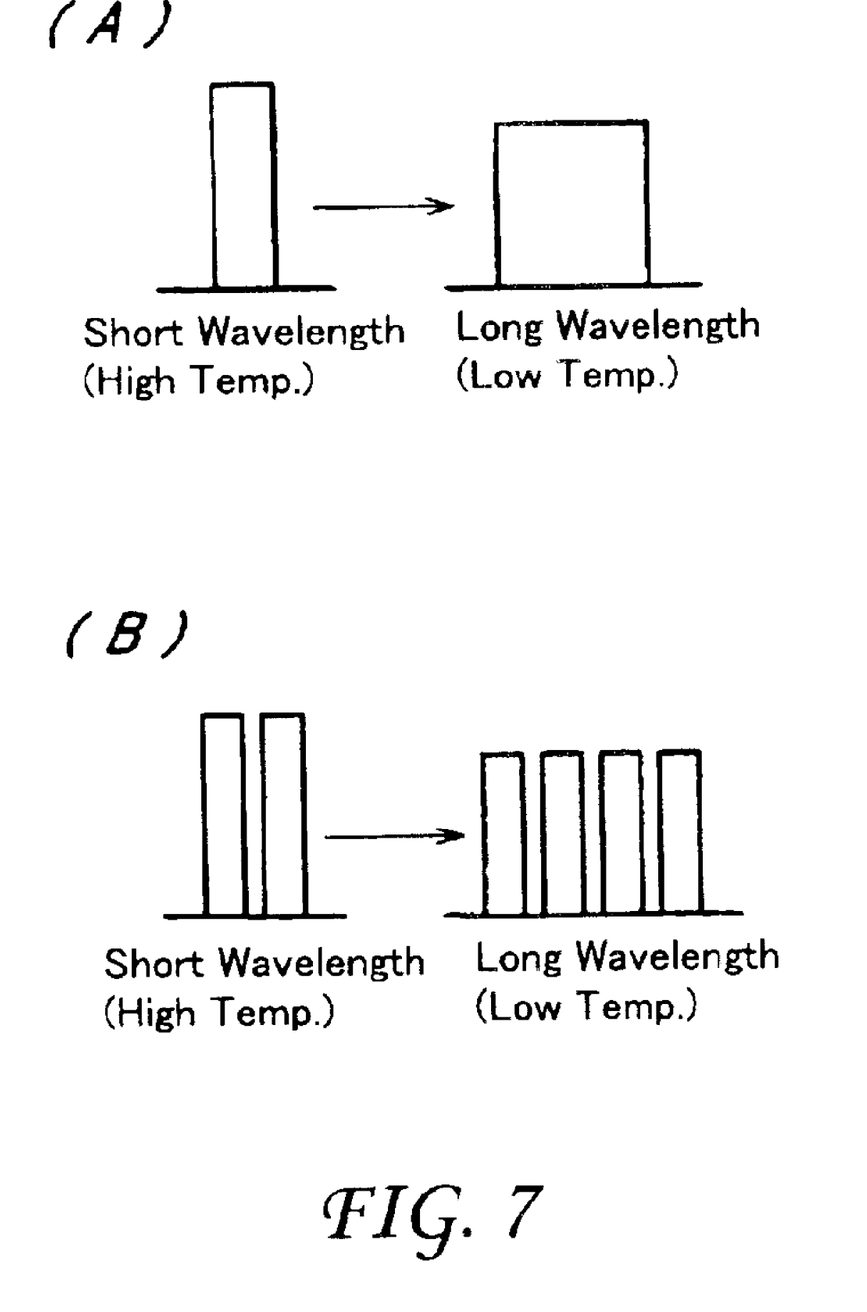
FIG. 7 is a chart diagram showing the pulse waveform of the applied energy in a recording method in accordance with the present invention.

Embodiment of Energy Application, see FIG. 7

In either of the thermal printer or the laser printer, an apparatus capable of controlling a pulse width at 10 milliseconds or less at longest, and preferably at 1 millisecond or less is used. The ultimate temperature and the retention time in accordance with the reproduction color can be controlled by changing the strength per unit time, and the application time length and/or applied pulse number of energy. For example, when the application time length is changed as shown in Table 1, the energy application time length is extended for recording at low temperatures requiring a longer response time than in the case of recording at high temperatures as shown in (A) of FIG. 7. Whereas, when the applied pulse number is changed as shown in Table 2, the energy application pulse number is increased for recording at low temperatures than in the case of recording at high temperatures as shown in (B) of FIG. 7.

Further, by controlling the energy application based on the pulse number, it is also possible to control not only the heating but also the cooling rate. At this step, such conditions are employed that one or more of the pulse width, the pulse interval, and the energy strength per unit time are different from those in the time of heating. The conditions of slow cooling can be achieved by applying energy with such a short pulse time length and a low frequency that the cholesteric liquid crystal material cannot respond after heating. For example, when a cholesteric liquid crystal material having a shortest respond time of 50 milliseconds is used, the conditions of slow cooling can be achieved by applying a 1-msec-width pulse at 5 Hz after heating.

EXAMPLE 1

A spacer made of silica with a mean particle size of 20 μm was dispersed in ethanol, and the resulting dispersion was spray coated onto a well-cleaned black polyethylene terephthalate (PET) (manufactured by TORAY industries Inc.: LUMILER X30, 12 μm in thickness) film. Then, a compound (A) having a cholesteric liquid crystallinity was put on the black PET, and molten on a 130° C. hot plate. A glass plate to which a transparent PET film (manufactured by TORAY Industries Inc.: LUMILER #6FC53, 6 μm in thickness) had been laminated was put thereon from above the molten compound (A) so that the transparent PET film side is in contact with the compound (A), followed by cooling down to room temperature. Thereafter, only the glass plate was removed therefrom. Then, the liquid crystal peripheral portion between the black PET and the transparent PET was bonded with Photolec (manufactured by Sekisui Finechemical Co., Ltd.) to obtain a thermoreversible recording medium in which the black PET was a support and the transparent PET was a protective layer.

The resulting thermoreversible recording medium was heated up to 130° C. on a hot plate to be rendered in an isotropic phase. Then, the medium was slowly cooled down to 80° C. to be in the state showing a selective reflection for green color. Thereafter, when it was immersed in ice water for quenching, it was fixed in the state of selective reflection for green color.

Then, the thermoreversible recording medium was irradiated from the thermosensitive recording layer side with a light (132 J/cm²·pulse, pulse width: 0.8 msec.) outputted from Nd3+; YAG laser (laser processing apparatus: LAY- 603A, manufactured by Toshiba Corp.) at 10 Hz three times. Consequently, the irradiated portion was changed into yellow-green color.

Comparative Example 1

A thermoreversible recording medium fixed in the selective reflection state for green color obtained in the same manner as in Example 1 described above was irradiated from the thermosensitive recording layer side with a light (132 J/cm$^2$·pulse, pulse width: 0.8 msec.) outputted from a YAG laser once. Consequently, no change was observed in the irradiated portion. Thus, when the pulse number is small, and the energy application time is short even if the output power is the same as in Example 1, writing cannot be performed.

EXAMPLE 2

A thermoreversible recording medium fixed in the selective reflection state for green color obtained in the same manner as in Example 1 described above was irradiated with a light (173 J/cm$^2$·pulse, pulse width: 0.8 msec.) outputted from a YAG laser once. Consequently, the irradiated portion was changed into blue color. In Comparative Example 1, when the output power was 132 J/cm$^2$·pulse, it was impossible to perform recording. However, when the laser light strength is increased to raise the ultimate temperature even if the pulse width was the same, it was possible to perform writing in color of a shorter wavelength. Namely, since the optimum energy application time differs according to the selective reflection wavelength, even for the same application time, it was impossible to perform writing in the long-wavelength selective reflection state at low temperatures, while it was possible to perform writing in the short-wavelength selective reflection state at high temperatures.

EXAMPLE 3

A thermoreversible recording medium was obtained in the same manner as in Example 1, except that a cholesteric liquid crystal material in Example 1 was altered so that a mixture ratio of compound (A) and compound (B) on a weight was 1:1. The resulting thermoreversible recording medium was heated up to 130° C. on a hot plate to be rendered in an isotropic phase. Then, the medium was slowly cooled down to 40° C. to be in the state showing a selective reflection for orange color. Thereafter, when it was immersed in ice water for quenching, it was fixed in the state of selective reflection for orange color.

Then, the thermoreversible recording medium was irradiated from the thermosensitive recording layer side with a light (150 J/cm$^2$·pulse, pulse width: 0.8 msec.) outputted from a YAG laser at 12 Hz twice. Consequently, the irradiated portion was changed into blue-green color.

EXAMPLE 4

A thermoreversible recording medium fixed in the selective reflection state for orange color obtained in the same manner as in Example 3 described above was irradiated with a light (140 J/cm$^2$·pulse, pulse width: 0.8 msec.) outputted from a YAG laser at 5 Hz five times. Consequently, the irradiated portion was changed into yellow color.

EXAMPLE 5

A thermoreversible recording medium obtained in the same manner as in Example 3 was heated up to 130° C. on a hot plate to be rendered in an isotropic phase. Then, the medium was slowly cooled down to 80° C. to be in the state showing a selective reflection for blue color. Then, when it was immersed in ice water for quenching, it was fixed in the selective reflection state for blue color. Thereafter, when the thermoreversible recording medium was heated from the thermosensitive recording layer side by means of a thermal head heated at 50° C. for 100 milliseconds, the heated portion was changed into green color, and it was able to be fixed in the state of selective reflection for green color by immediate quenching.

Comparative Example 2

A thermoreversible recording medium fixed in the selective reflection state for blue color obtained in the same manner as in Example 5 described above was heated up to 50° C. from the thermosensitive recording layer side by means of a thermal head for 10 milliseconds. Consequently, no change was observed in the heated portion. Thus, if the energy application time is short, it is impossible to change the color.

EXAMPLE 6

A thermoreversible recording medium fixed in the selective reflection state for blue color obtained in the same manner as in Example 5 was subjected to 10-msec heating from the thermosensitive recording layer side by means of a thermal head heated at 50° C. every 50 milliseconds 5 times. Consequently, the heated portion was changed into yellow-green color, and it was able to be fixed in the state of selective reflection for yellow-green color by immediate quenching. Thus, by performing short heating several times, it was possible to conduct writing.

EXAMPLE 7

A thermoreversible recording medium obtained in the same manner as in Example 5 was heated up to 130° C. on a hot plate to be rendered in an isotropic phase. Then, the medium was slowly cooled down to 40° C. to be in the state showing a selective reflection for orange color. Thereafter, when it was immersed in ice water for quenching, it was fixed in the state of selective reflection for orange color. Then, the thermoreversible recording medium was subjected to 10-msec heating from the thermosensitive recording layer side by means of a thermal head heated at 80° C. every 50 milliseconds 3 times. Consequently, the heated portion was changed into blue color, and it was fixed in the state of selective reflection for blue color by immediate quenching.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

Particularly, for the configuration to heat the recording medium 1, various apparatuses other than the foregoing thermal printer and laser printer can be used.

Further, in the foregoing example of Table 1, it has been assumed that the pulse widths of applied voltage pulses for respective reproduction colors have the relationship of $W_1 > W_2 > W_3 > \ldots > W_n$. However, not limited thereto, for example, such a relationship is also acceptable that $W_1 = W_2 = W_3 > W_4 = W_5 = W_6 > W_7 = W_8 = W_9 > \ldots > W_{(n-5)} = W_{(n-4)} = W_{(n-3)} > W_{(n-2)} = W_{(n-1)} = W_n$. Similarly, in the example of Table 2, it has been assumed that the applied voltage pulse numbers for respective reproduction colors have the relationship of $N_1 > N_2 > N_3 > \ldots > N_n$. However, not limited thereto, for example, such a relationship is also acceptable that $N_1 = N_2 = N_3 > N_4 = N_5 = N_6 > N_7 = N_8 = N_9 > \ldots > N_{(n-5)} = N_{(n-4)} = N_{(n-3)} > N_{(n-2)} = N_{(n-1)} = N_n$.

What is claimed is:

1. A method for recording an image on a thermosensitive image bearing medium that contains liquid crystal material exhibiting a cholesteric phase at a temperature range higher than a room temperature, said method comprising the steps of:

(a) heating the liquid crystal material contained in a first region of the thermosensitive image bearing medium at a first temperature for a first time period by applying a first energy, thereby causing the first region to change from a base color to a first color; and (b) heating the liquid crystal material contained in a second region of the thermosensitive image bearing medium at a second temperature for a second time period by applying a second energy, thereby causing the second region to change to a second color, the second color being different from the first color, the first temperature being higher than the second temperature and the first time period being shorter than the second time period, wherein the (a) is executed simultaneously with the step (b).

2. A method for recording an image on a thermosensitive image bearing medium that contains liquid crystal material exhibiting a cholesteric phase at a temperature range higher than a room temperature, said method comprising the steps of:

(a) heating the liquid crystal material contained in a first region of the thermosensitive image bearing medium at a first temperature for a first time period by applying a first energy, thereby causing the first region to chance from a base color to a first color; and (b) heating the liquid crystal material contained in a second region of the thermosensitive image bearing medium at a second temperature for a second time period by applying a second energy, thereby causing the second region to change to a second color, the second color being different from the first color, the first temperature being higher than the second temperature and the first time period being shorter than the second time period, wherein the steps (a) and (b) are executed in any order and wherein the first color is represented by light of a first wavelength and the second color is represented by light of a second wavelength that is longer than the first wavelength.

3. A method for recording an image on a thermosensitive image bearing medium that contains liquid crystal material exhibiting a cholesteric phase at a temperature range higher than a room temperature, said method comprising the steps of:

(a) heating the liquid crystal material contained in the thermosensitive image bearing medium at a first temperature for a first time period by applying a first energy; and (b) heating the liquid crystal material contained in the thermosensitive image bearing medium at a second temperature for a second time period by applying a second energy the first temperature being higher than the second temperature and the first time period being shorter than the second time period, wherein the step (a) is executed simultaneously with the step (b).

4. A method for recording an image on a thermosensitive image bearing medium that contains liquid crystal material exhibiting a cholesteric phase at a temperature range higher than a room temperature, said method comprising the steps of:

(a) heating the liquid crystal material contained in the thermosensitive image bearing medium at a first temperature for a first time period by applying a first energy; and (b) heating the liquid crystal material contained in the thermosensitive image bearing medium at a second temperature for a second time period by applying a second energy the first temperature being higher than the second temperature and the first time period being shorter than the second time period, (c) generating first and second signals based on image data, the first and second signals being respectively for reproducing a first color and a second color, the first and second color being different from each other and the first color being represented by light of a first wavelength and the second color being represented by light of a second wavelength that is longer than the first wavelength, wherein the applications of the first and second energies are respectively executed by driving a writing head based on the first and second signals, and wherein the steps (a) and (b) are executed in any order.

* * * * *